United States Patent
Farah (10) Patent No.: US 7,620,164 B1
(45) Date of Patent: Nov. 17, 2009

(54) METHOD AND APPARATUS FOR PROVIDING EXTENSION MANAGEMENT IN VOICE OVER INTERNET PROTOCOL PREMISES

(75) Inventor: Jeffrey J. Farah, North Brunswick, NJ (US)

(73) Assignee: AT&T Corp., New York, NY (US)

( * ) Notice: Subject to any disclaimer, the term of this patent is extended or adjusted under 35 U.S.C. 154(b) by 135 days.

(21) Appl. No.: 11/314,285

(22) Filed: Dec. 21, 2005

(51) Int. Cl.
*H04M 13/00* (2006.01)

(52) U.S. Cl. .................. 379/179; 370/352; 379/201.01; 379/164

(58) Field of Classification Search .................. 379/198, 379/215.01, 214.01, 177, 179, 156, 215, 379/207.01, 158, 164; 370/352, 356
See application file for complete search history.

(56) References Cited

U.S. PATENT DOCUMENTS

| | | | |
|---|---|---|---|
| 6,477,248 B1 * | 11/2002 | Bruhnke et al. | 379/399.01 |
| 6,628,768 B1 * | 9/2003 | Ramaswamy et al. | 379/202.01 |
| 6,697,358 B2 * | 2/2004 | Bernstein | 370/352 |
| 7,003,091 B1 * | 2/2006 | Burns et al. | 379/265.11 |
| 7,023,867 B1 * | 4/2006 | Park et al. | 370/419 |
| 7,221,672 B2 * | 5/2007 | Ollis et al. | 370/352 |
| 2006/0072546 A1 * | 4/2006 | Chen | 370/352 |
| 2006/0221943 A1 * | 10/2006 | Aborn et al. | 370/356 |

\* cited by examiner

*Primary Examiner*—Olisa Anwah (57) ABSTRACT

A method and apparatus for allowing all the extensions connected to an enhanced Terminal Adaptor (TA) associated with a single phone number to place and receive phone calls independently are disclosed. For example, in the case of a call waiting scenario, if an extension is already engaged in an ongoing phone call, then the enhanced TA provides call waiting handling to the engaged extension similar to traditional call waiting when a subsequent incoming call is received. However, the enhanced TA also rings the remaining extensions that are not currently engaged in phone calls when the subsequent incoming call is received.

2 Claims, 5 Drawing Sheets

METHOD AND APPARATUS FOR PROVIDING EXTENSION MANAGEMENT IN VOICE OVER INTERNET PROTOCOL PREMISES

The present invention relates generally to communication networks and, more particularly, to a method and apparatus for providing extension management in Voice over Internet Protocol (VoIP) customer premises in communication networks, e.g., packet networks such as Voice over Internet Protocol (VoIP) networks.

BACKGROUND OF THE INVENTION

In a VoIP customer premise, present implementations of VoIP services use a telephone port in a Terminal Adaptor (TA) associated with a single phone number as the interface to a VoIP enabled customer premise. Extensions that are associated with the particular telephone port and its associated phone number are typically considered in the same vein as Plain Old Telephone Service (POTS) extensions. For instance, when a phone call destined to the telephone port in a TA that has been assigned a particular phone number comes into a VoIP customer premise, all the extensions that are connected to the telephone port in that TA will ring simultaneously and any of the extensions connected to the telephone port in that TA can be used to answer the incoming call. An extension is a telephone set connected to the telephone port in a TA that has been assigned a particular phone number. Once a particular extension connected to the TA is engaged in a phone call, the remaining extensions in the customer premise connected to the TA will not be able to make and receive calls. Note that if a TA is equipped with multiple telephone ports, then each of these telephone ports will be assigned a different phone number and operate independently from each other.

Therefore, a need exists for a method and apparatus for providing extension management in Voice over Internet Protocol (VoIP) customer premises in a packet network, e.g., a VoIP network.

SUMMARY OF THE INVENTION

In one embodiment, the present invention allows all the extensions connected to an enhanced TA associated with a single phone number to place and receive phone calls independently. For example, in the case of call waiting scenario, if an extension is already engaged in an ongoing phone call, then the enhanced TA provides call waiting handling to the engaged extension similar to traditional call waiting when a subsequent incoming call is received. In addition, the enhanced TA also rings the remaining extensions that are not currently engaged in phone calls when the subsequent incoming call is received. If the subsequent incoming call is answered by the engaged extension, e.g., off hook, via a call waiting flash hook, the previous phone call will be placed on hold. If the subsequent incoming call is answered by one of the unused extensions, e.g., on hook, the subsequent incoming call is answered and connected to the unused extension without affecting the ongoing phone call currently being handled by the engaged extension. Furthermore, in one embodiment, extensions that are not currently engaged in phone calls can also be used to make outgoing calls without affecting the ongoing phone calls engaged by other extensions currently in use.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
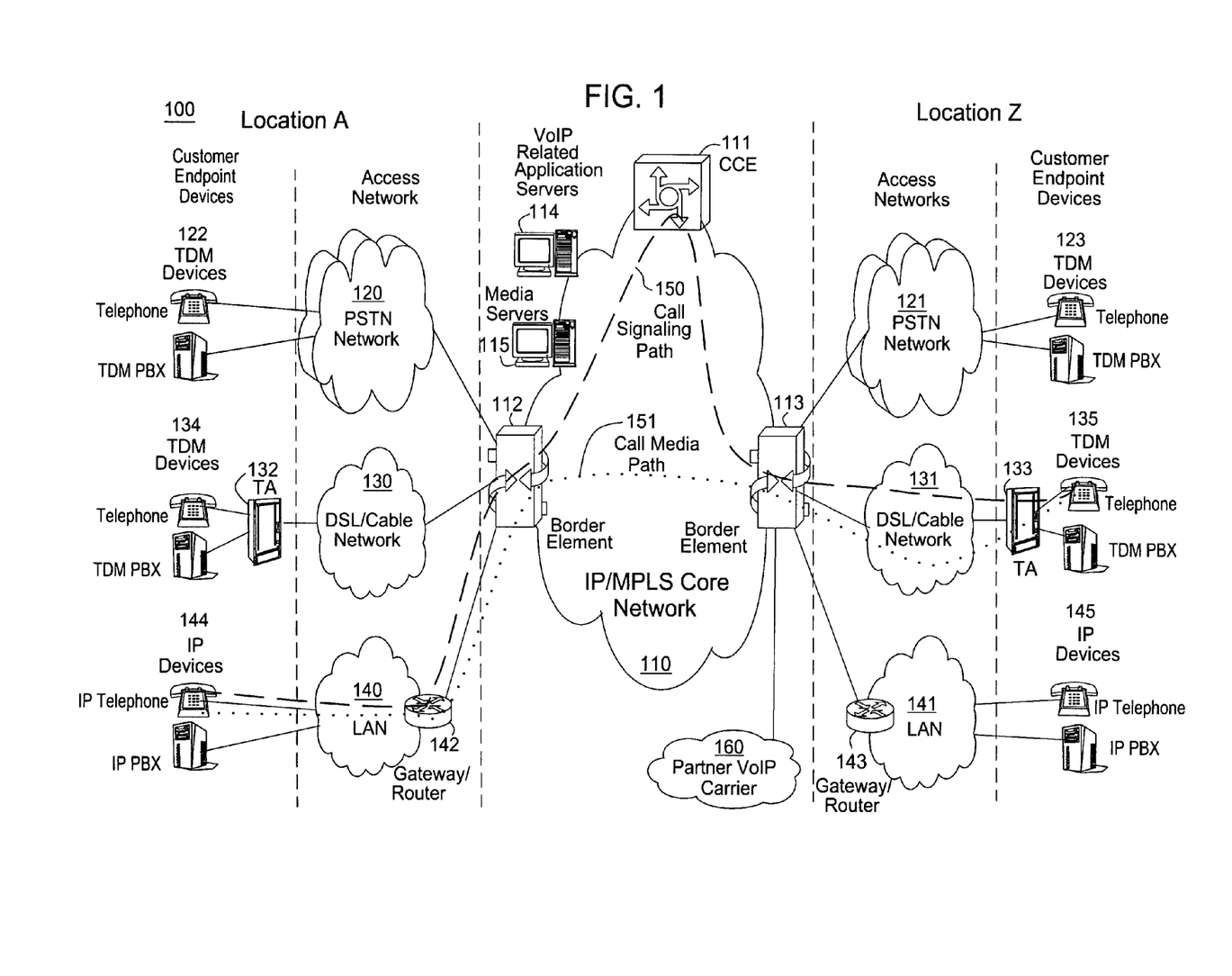
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices. It should be noted that a wireless access network is also contemplated as well if wireless endpoint devices are deployed (not shown).

The core VoIP infrastructure is comprised of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

In a VoIP customer premise, present implementations of VoIP services use a telephone port in a Terminal Adaptor (TA) associated with a single phone number as the interface to a VoIP enabled customer premise. Extensions that are associated with the particular telephone port and its associated phone number are typically considered in the same vein as Plain Old Telephone Service (POTS) extensions. For instance, when a phone call destined to the telephone port in a TA that has been assigned a particular phone number comes into a VoIP customer premise, all the extensions that are connected to the telephone port in that TA will ring simultaneously and any of the extensions connected to the telephone port in that TA can be used to answer the incoming call. An extension is a telephone set connected to the telephone port in a TA that has been assigned a particular phone number. Once a particular extension connected to the TA is engaged in a phone call, the remaining extensions in the customer premise connected to the TA will not be able to make and receive calls.

To address this need, the present invention allows all the extensions connected to an enhanced TA associated with a single phone number to place and receive phone calls independently. In the case of call waiting scenario, if an extension is already engaged in an ongoing phone call, then the enhanced TA provides call waiting handling to the engaged extension similar to traditional call waiting when a subsequent incoming call is received. In addition, the enhanced TA also rings the remaining extensions that are not currently engaged in phone calls when the subsequent incoming call is received. If the subsequent incoming call is answered by the engaged extension, e.g., off hook, via a call waiting flash hook, the previous phone call will be placed on hold. A flash hook signal is a brief on hook period introduced by an off hook phone, e.g., an off hook phone goes on hook for a brief period and then goes off hook again. If the subsequent incoming call is answered by one of the unused extensions, e.g., on hook, the subsequent incoming call is answered and connected to the unused extension without affecting the ongoing phone call currently being handled by the engaged extension. Furthermore, in one embodiment, extensions that are not currently engaged in phone calls can also be used to make outgoing calls without affecting the ongoing phone calls engaged by other extensions currently in use.

Figure 2:
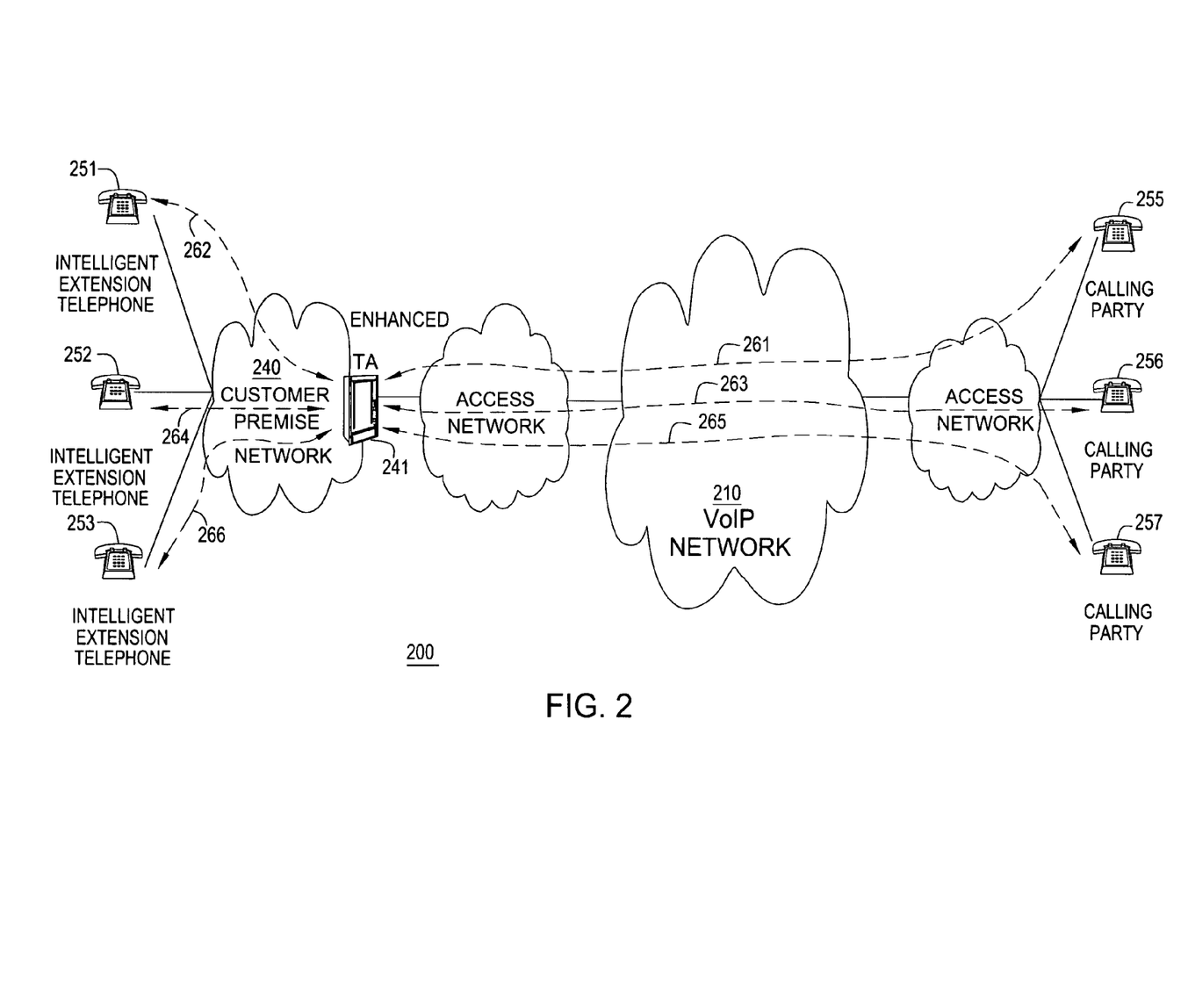
FIG. 2 illustrates an example of extension management in Voice over Internet Protocol (VoIP) customer premises in a VoIP network of the present invention.

FIG. 2 illustrates an example of extension management in Voice over Internet Protocol (VoIP) customer premises in a VoIP network 200 of the present invention. In FIG. 2, an enhanced TA, e.g., enhanced TA 241, is placed at an initial access point of the VoIP enabled customer premise. Connected to enhanced TA 241 are intelligent extension telephones 251, 252, and 253. These intelligent extension telephones communicate with enhanced TA 241 via customer premise network 240 and are identified by a unique node identifier which can be, for example a Media Access Control (MAC) address, an IP address, or simply a unique extension id number (e.g., Ext1, Ext2, etc.). In one embodiment, a MAC address is a 48 bit hardware address assigned by the Institute of Electrical and Electronic Engineers (IEEE) that uniquely identifies a node within a network. Customer premise network 240 can be either a wired or wireless network including, but not limited to, layer 1, layer 2, or layer 3 networks. For instance, customer premise network 240 can be an 802.11 based wireless network, an Ethernet switching network, or an IP routing network. Although the present invention is described in the context of a terminal adaptor, the present invention is not so limited. Namely, any equivalent devices that may perform the functions as described in the present disclosure are within the scope of the present invention.

Enhanced TA 241 manages the communication interactions including, but not limited to, on or off hook control, flash hook control, and/or call routing between each of the intelligent extensions and between each of the intelligent extensions and VoIP network 210. For example, assuming that all extensions within customer premise network 240 are initially on hook, if an incoming call is received by enhanced TA 241 from a calling party 255 using flow 261, then enhanced TA 241 rings intelligent extension telephones 251, 252, and 253 using flows 262, 264, and 266 respectively. The incoming call from the calling party 255 is subsequently answered by a subscriber using intelligent extension telephone 251. Enhanced TA 241 detects that intelligent extension telephone 251 has gone off hook and connects the call between the calling party 255 and intelligent extension telephone 251 using flows 261 and 262.

Subsequently, enhanced TA 241 receives another incoming call from a calling party 256 via flow 263. Enhanced TA 241 sends a call waiting indication signal to intelligent extension telephone 251 using flow 262 since intelligent extension telephone 251 is currently engaged in a call with calling party 255. At the same time, enhanced TA 241 rings intelligent extension telephones 252 and 253 using flows 264 and 266, respectively.

If the incoming call from calling party 256 is answered by intelligent extension telephone 251 by sending a flash hook signal to enhanced TA 241, the ongoing call between intelligent extension telephone 251 and calling party 255 will be placed on hold and enhanced TA 241 will connect the incoming call from calling party 256 to intelligent extension telephone 251 using flows 263 and 262. However, if the incoming call from calling party 256 is answered by an on hook intelligent extension telephone, such as intelligent extension telephone 252, enhanced TA 241 will then connect the incoming call from calling party 256 to intelligent extension telephone 252 using flows 263 and 264. The answered call will be connected by enhanced TA 241 between calling party 256 and intelligent extension telephone 252 without affecting the ongoing call between calling party 255 and intelligent extension telephone 251.

Further assuming that the second incoming call is answered by intelligent extension telephone 252, enhanced TA 241 now supports two ongoing calls simultaneously. Namely, enhanced TA 241 is concurrently supporting the first call between calling party 255 and intelligent extension telephone 251 and the second call between calling party 256 and intelligent extension telephone 252.

To extend the above example further, while the two ongoing calls are active, intelligent extension telephone 253 can be taken off hook by a subscriber to place an outgoing call via enhanced TA 241 to a calling party 257 using flows 266 and 265. After the outgoing call has been connected, enhanced TA 241 then simultaneously supports a third ongoing call without affecting the aforementioned two ongoing calls.

Subsequently, in one embodiment, while the three ongoing calls are active, a subscriber who is using intelligent extension telephone 251 can use a flash hook signal (or an equivalent signal) to toggle among each of the three ongoing calls. For example, the subscriber who is engaging in a phone call using intelligent extension telephone 251 with calling party 255 can send a flash hook signal to enhanced TA 241 to place the call with calling party 255 on hold and toggle from the call with calling party 255 to join the call between intelligent extension telephone 252 and calling party 256. The subscriber can further send another flash hook signal to enhanced TA 241 to leave the recently joined call between intelligent extension telephone 252 and calling party 256, to continue to place the call with calling party 255 on hold, and to toggle from the call with calling party 256 to join the call between intelligent extension telephone 253 and calling party 257. The subscriber can subsequently send another flash hook signal to enhanced TA 241 to leave the recently joined call between intelligent extension telephone 253 and calling party 257 to resume the original call with calling party 255 who has previously been placed on hold.

In one embodiment, the use of a flash hook signal by an active intelligent extension telephone device will toggle the active intelligent extension telephone among all active phone calls connected via an enhanced TA in a round robin fashion. In one alternate embodiment, the present invention may present a menu (e.g., on a display or screen of the telephone) to show one or more active phone calls that can be directly accessed or joined via a flash hook signal or an equivalent signal (i.e., without having to toggle through all the active calls). In another embodiment, an enhanced TA can send an audible tone to an active intelligent extension telephone engaging in a phone call to indicate that the phone call is now being joined by another intelligent extension telephone using the flash hook toggling feature. In another embodiment, an enhanced TA can request a user using an active intelligent extension telephone engaging in a phone call to confirm that it is acceptable to allow another intelligent extension telephone to join the phone call using the flash hook toggling feature for security and privacy purposes.

Figure 3:
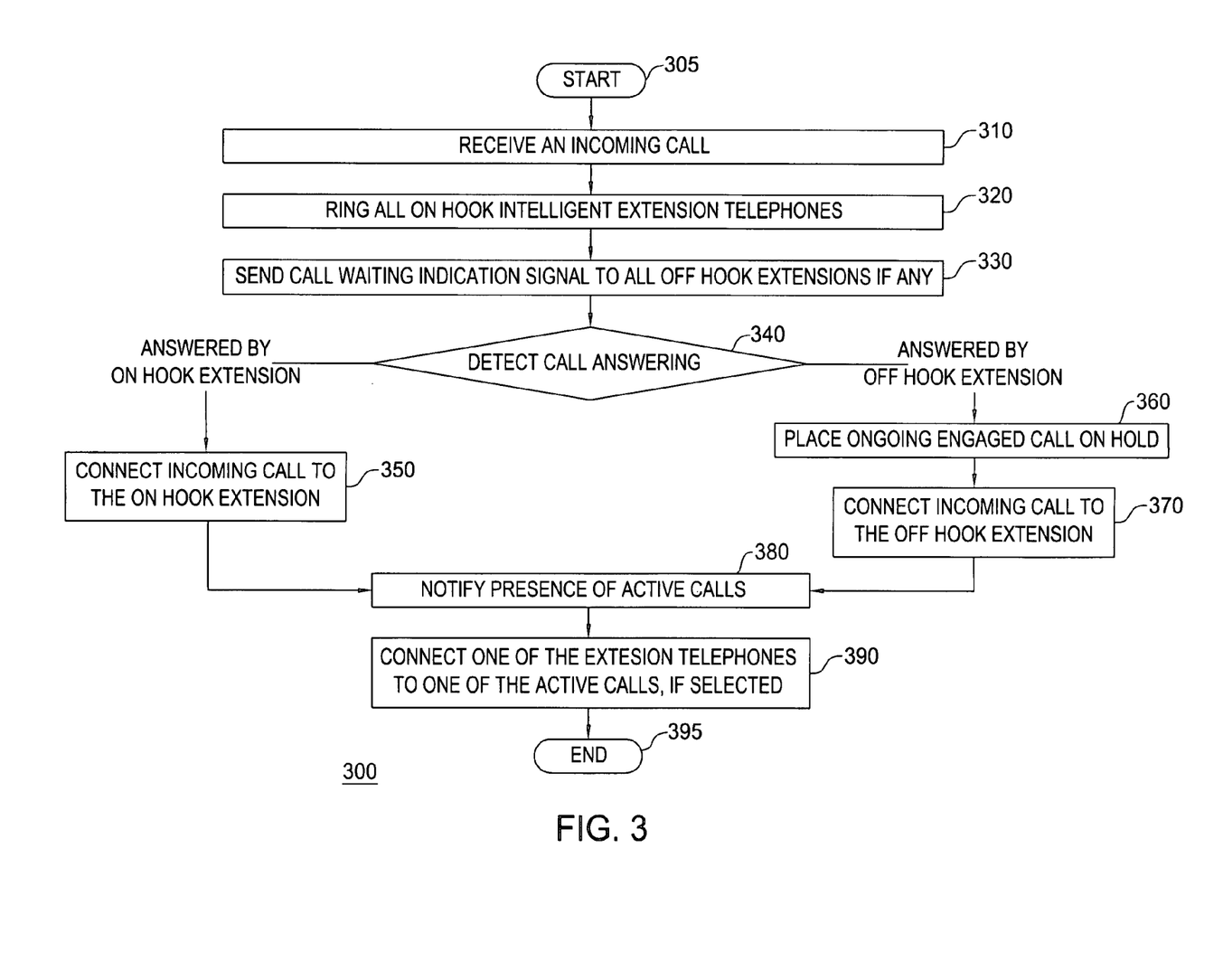
FIG. 3 illustrates a flowchart of a method for receiving incoming calls by an enhanced TA in a packet network, e.g., a VoIP network, of the present invention.

FIG. 3 illustrates a flowchart of a method 300 for receiving incoming calls by an enhanced TA in a packet network, e.g., a VoIP network, of the present invention. Method 300 starts in step 305 and proceeds to step 310.

In step 310, the method receives an incoming call from the VoIP network.

In step 320, the method rings all attached intelligent extension telephones.

In step 330, the method sends call waiting indication signals to all off hook intelligent extension telephones, if any.

In step 340, the method detects the incoming call is answered by an intelligent extension telephone. If the incoming call is answered by an on hook intelligent extension telephone, the method proceeds to step 350. If the incoming call is answered by an off hook intelligent extension telephone using a flash hook signal, the method proceeds to step 360.

In step 350, the method connects the incoming call to the on hook intelligent extension telephone.

In step 360, the method places an ongoing engaged call on hold.

In step 370, the method connects the incoming call to the off hook intelligent extension telephone.

In step 380, the method 300 may optionally notify all extensions (e.g., on-hook and/or off-hook extensions of the presence of active calls. For example, the presence of these active calls can be visually displayed on a screen located on the telephone.

In step 390, the method 300 may optionally connect one of the extension telephone to one of the active calls, if selected. For example, an on-hook extension may go off-hook to select one of the active calls, thereby joining an existing call.

Figure 4:
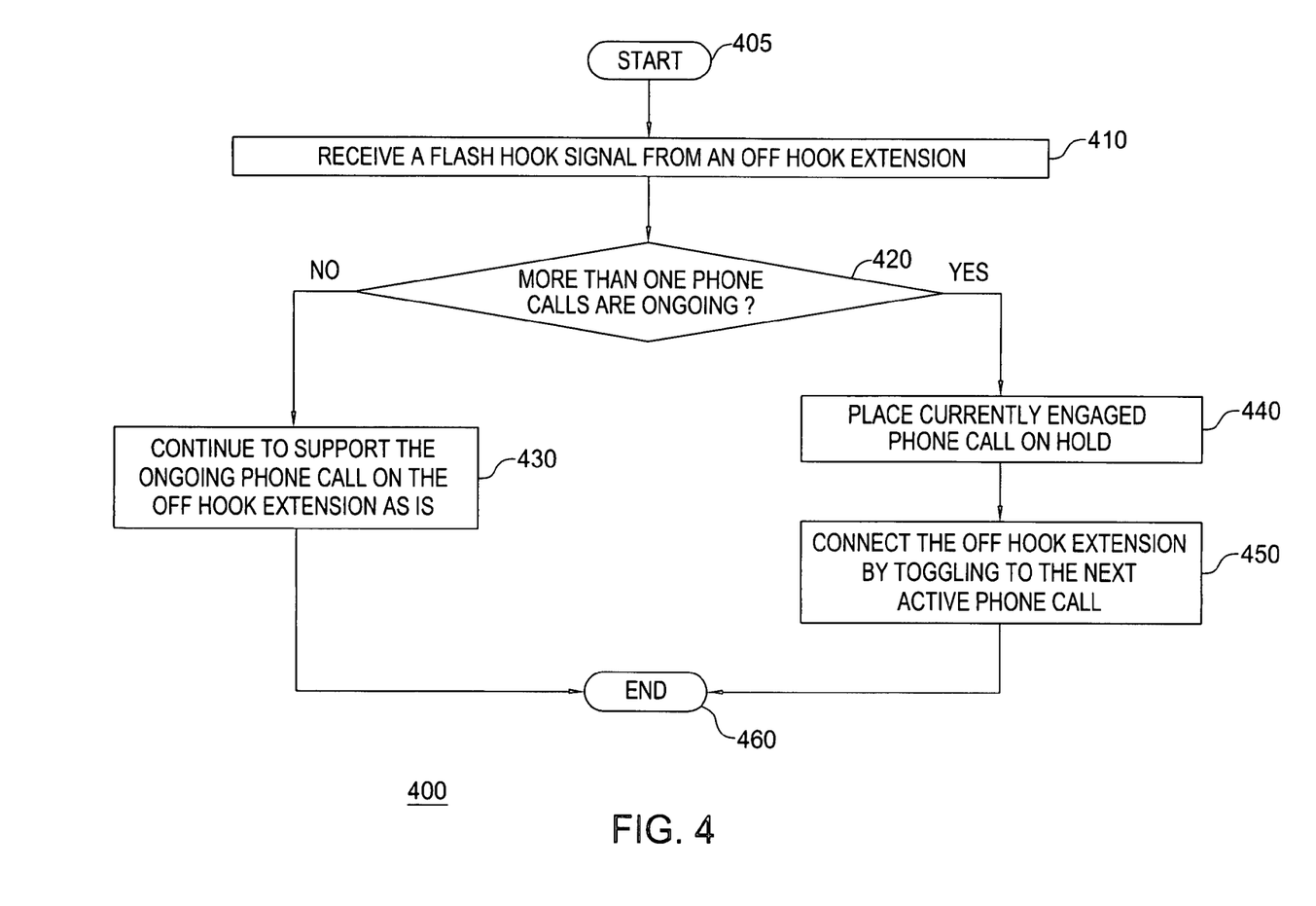
FIG. 4 illustrates a flowchart of a method for processing flash hook signal from an off hook extension by an enhanced TA in a packet network, e.g., a VoIP network, of the present invention.

FIG. 4 illustrates a flowchart of a method 400 for processing a flash hook signal from an off hook extension by an enhanced TA in a packet network, e.g., a VoIP network, of the present invention. Method 400 starts in step 405 and proceeds to step 410.

In step 410, the method receives a flash hook signal from an off hook extension that is currently engaged in an active phone call.

In step 420, the method checks if there is more than one ongoing active phone call supported by an enhanced TA. If there is more than one ongoing active phone call supported by the enhanced TA, the method proceeds to step 440; otherwise, the method proceeds to step 430.

In step 430, the method continues to support the ongoing phone call connected to the off hook intelligent extension telephone as is.

In step 440, the method places the ongoing phone call on hold.

In step 450, the method connects the off hook intelligent extension telephone by toggling to the next active phone calls currently supported by the enhanced TA. As discussed above, in one embodiment, direct selection of an active call can be implemented without toggling through all the active calls. In one embodiment, the use of a flash hook signal by an active intelligent extension telephone device will toggle the active intelligent extension telephone among all active phone calls connected via an enhanced TA in a round robin fashion. In another embodiment, an enhanced TA can send an audible tone to an active intelligent extension telephone engaging in a phone call to indicate that the phone call is now joined by another intelligent extension telephone using the flash hook toggling feature. In another embodiment, an enhanced TA can request a user using an active intelligent extension telephone engaging in a phone call to confirm that it is acceptable to allow another intelligent extension telephone to join the phone call using the flash hook toggling feature for security and privacy purposes. The method ends in step 460.

Figure 5:
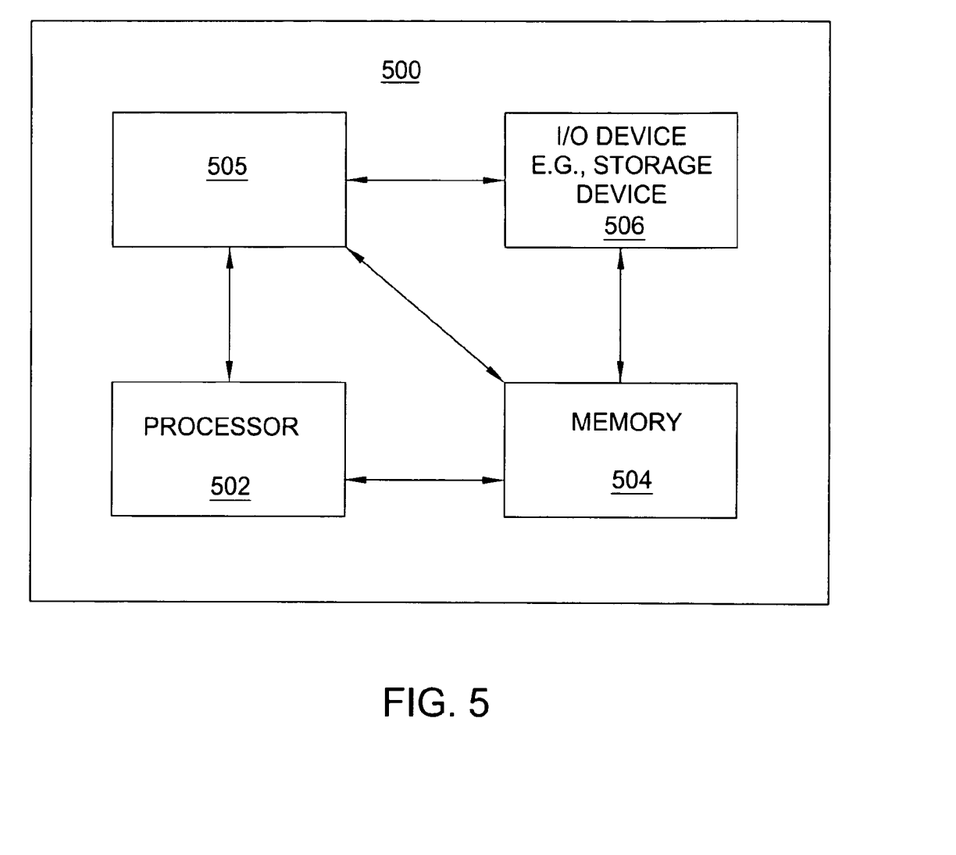
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing extension management in VoIP customer premises, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing extension management in VoIP customer premises can be loaded into memory 504 and executed by processor 502 to implement the functions as discussed above. As such, the present process 505 for providing extension management in VoIP customer premises (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing extension management in a communication network, comprising:

processing a first phone call using a Terminal Adaptor (TA) having only a single assigned telephone number, where said TA is connected to a plurality of extension telephones;

processing a second phone call simultaneously using said TA, where said first phone call and said second phone call are connected to at least one of said plurality of extension telephones via said TA;

receiving a flash hook signal from one of said plurality of extension telephones that is off hook and is actively engaged in said first phone call;

placing said first phone call on hold; and connecting said one of said plurality of extension telephones that is off hook to said second phone call that is actively engaged with another extension telephone from said plurality of extension telephones, wherein said connecting further comprises:

sending an audible tone to said another extension telephone for indicating that said one of said plurality of extension telephones that is off hook is joining said second phone call; or sending a request to said another extension telephone for indicating that said one of said plurality of extension telephones that is off hook is requesting to join said second phone call.

2. A computer-readable medium having stored thereon a plurality of instructions, the plurality of instructions including instructions which, when executed by a processor, cause the processor to perform steps of a method for providing extension management in a communication network, comprising:

processing a first phone call using a Terminal Adaptor (TA) having only a single assigned telephone number, where said TA is connected to a plurality of extension telephones;

processing a second phone call simultaneously using said TA, where said first phone call and said second phone call are connected to at least one of said plurality of extension telephones via said TA;

receiving a flash hook signal from one of said plurality of extension telephones that is off hook and is actively engaged in said first phone call;

placing said first phone call on hold; and connecting said one of said plurality of extension telephones that is off hook to said second phone call that is actively engaged with another extension telephone from said plurality of extension telephones, wherein said connecting further comprises:

sending an audible tone to said another extension telephone for indicating that said one of said plurality of extension telephones that is off hook is joining said second phone call; or sending a request to said another extension telephone for indicating that said one of said plurality of extension telephones that is off hook is requesting to join said second phone call.

* * * * *